(12) United States Patent
Park et al.

(10) Patent No.: US 9,496,082 B2
(45) Date of Patent: Nov. 15, 2016

(54) COIL SUBSTRATE FOR WIRELESS CHARGING AND ELECTRIC DEVICE USING THE SAME

(71) Applicant: SAMSUNG ELECTRO-MECHANICS CO., LTD., Suwon (KR)

(72) Inventors: No Il Park, Suwon (KR); Chang Ryul Jung, Suwon (KR); Hak Kwan Kim, Suwon (KR); Sung Yong An, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 263 days.

(21) Appl. No.: 13/888,692

(22) Filed: May 7, 2013

(65) Prior Publication Data
US 2014/0266030 A1    Sep. 18, 2014

(30) Foreign Application Priority Data
Mar. 12, 2013  (KR) .................. 10-2013-0026143

(51) Int. Cl.
| *H01F 38/14* | (2006.01) |
|---|---|
| *H01F 27/34* | (2006.01) |
| *H01F 27/36* | (2006.01) |
| *H02J 5/00* | (2016.01) |
| *H01F 27/28* | (2006.01) |

(52) U.S. Cl.
CPC .............. *H01F 38/14* (2013.01); *H01F 27/34* (2013.01); *H01F 27/362* (2013.01); *H02J 5/005* (2013.01); *H01F 27/2804* (2013.01); *H01F 27/2871* (2013.01)

(58) Field of Classification Search
CPC ....................................................... H01F 38/14
USPC ............................................................ 320/108
See application file for complete search history.

(56) References Cited

U.S. PATENT DOCUMENTS

| 5,898,403 | A | * | 4/1999 | Saitoh ...................... H01Q 1/38 333/185 |
|---|---|---|---|---|
| 6,906,411 | B1 | * | 6/2005 | Katsura et al. ............... 257/700 |
| 8,125,401 | B2 | * | 2/2012 | Ito ..................... G06K 19/07749 343/787 |
| 2009/0096694 | A1 | * | 4/2009 | Ito et al. ....................... 343/788 |
| 2011/0198940 | A1 | * | 8/2011 | Urano ..................... H01F 38/14 307/104 |
| 2012/0274148 | A1 | * | 11/2012 | Sung .................... H04B 5/0037 307/104 |
| 2012/0293120 | A1 | * | 11/2012 | Jang ..................... H01Q 1/2225 320/108 |
| 2013/0009488 | A1 | * | 1/2013 | Choe ...................... H02J 5/005 307/104 |
| 2014/0210406 | A1 | * | 7/2014 | Na .......................... H02J 7/025 320/108 |

FOREIGN PATENT DOCUMENTS

KR    10-2010-0130480        12/2010

* cited by examiner

*Primary Examiner* — Samuel Berhanu
*Assistant Examiner* — Tessema Kebede
(74) *Attorney, Agent, or Firm* — McDermott Will & Emery LLP (57) ABSTRACT

There are provided a coil substrate which includes a coil for wireless charging and an antenna and is capable of increasing charging efficiency, and an electronic device including the same. The coil substrate according to embodiments of the invention may include a coil pattern; a dummy part formed around the coil pattern; and at least one penetration part formed in the dummy part or in a central portion of the coil pattern.

9 Claims, 5 Drawing Sheets

COIL SUBSTRATE FOR WIRELESS CHARGING AND ELECTRIC DEVICE USING THE SAME

CROSS-REFERENCE TO RELATED APPLICATIONS

This application claims the priority of Korean Patent Application No. 10-2013-0026143 filed on Mar. 12, 2013, in the Korean Intellectual Property Office, the disclosure of which is incorporated herein by reference.

BACKGROUND OF THE INVENTION

1. Field of the Invention

The present invention relates to a coil substrate for wireless charging and an electronic device including the same and, more particularly, to a coil substrate for wireless charging, which includes a coil for wireless charging and an antenna and is capable of improving charging efficiency, and an electronic device including the same.

2. Description of the Related Art

In general, a portable electronic device such as a mobile communications terminal, a personal digital assistant (PDA), or the like, is provided with a secondary cell rechargeable battery.

In order to charge the battery, a separate charging device providing electrical energy to the battery of the portable electronic device using commercially available electrical power is required.

Typically, the charging device and the battery include dedicated contact terminals formed on external surfaces thereof, respectively, such that the charging device and the battery are electrically connected to each other through contact between the contact terminals.

However, when the contact terminals as described above are protruded to external surfaces, the contact terminals spoil the aesthetic appearance of the devices and may be contaminated with external foreign objects, such that a contact state therebetween may be easily degraded. In addition, in the case in which the battery is short-circuited or exposed to moisture due to a user's inadvertent mistake, charged energy may easily be lost.

As an alternative to the above-mentioned contact type charging scheme, a wireless charging scheme has been proposed in which the battery is charged in a manner in which power is wirelessly transmitted without the necessity for the contact terminals of the charging device and the battery to be in contact with each other.

In general, wireless charging means that power is transmitted wirelessly to a portable electronic device having a battery using a wireless charging device.

The wireless charging device and the portable electronic device transmit/receive power using electromagnetic induction. To this end, each of the wireless charging device and the portable electronic device is provided with a coil for wireless charging.

As the functions that portable electronic devices provide are multiplied, coils for wireless charging and various forms of antennas are complexly disposed. Further, due to recent trends for the manufacturing of ultra-thin electronic devices, coils for wireless charging and antennas may be disposed in close proximity. As a consequence, interference therebetween may occur, thereby degrading charging efficiency.

RELATED ART DOCUMENT (Patent Document 1) Korean Patent Laid-open Publication No. 2010-0130480

SUMMARY OF THE INVENTION

An aspect of the present invention provides a coil substrate for wireless charging in which a coil for wireless charging and an antenna are formed together, and an electronic device including the same.

Another aspect of the present invention also provides a coil substrate for wireless charging in which interference between a coil for wireless charging and an antenna formed together therein is minimized, and an electronic device including the same.

Another aspect of the present invention also provides a coil substrate for wireless charging which is capable of improving charging efficiency by effectively forming the flow of magnetic flux generated in a device, and an electronic device including the same.

According to an aspect of the present invention, there is provided a coil substrate for wireless charging including: a coil pattern; a dummy part formed around the coil pattern; and at least one penetration part formed in the dummy part or in a central portion of the coil pattern.

The coil substrate may further include an antenna formed inwardly of or outwardly of the coil pattern.

The dummy part may be formed between the coil pattern and the antenna.

The coil substrate may further include a circuit part formed on one side of the coil pattern to be electrically connected to the coil pattern.

The coil substrate may further include a ground pattern formed on the dummy part.

The antenna may be used for near field communications.

According to another aspect of the present invention, there is provided a coil substrate for wireless charging, including: at least one coil pattern, at least one antenna spaced apart from the coil pattern, and at least one penetration part disposed between the coil pattern and the antenna.

The coil substrate may further include a ground pattern between the coil pattern and the antenna, and the penetration part may be formed within the ground pattern.

According to another aspect of the present invention, there is provided an electronic device, including: a coil substrate for wireless charging including at least one coil pattern and at least one antenna; and a magnetic part attached to a surface of the coil substrate, wherein the coil substrate has at least one penetration part formed between the coil pattern and the antenna.

The coil substrate may have a dummy part formed between the coil pattern and the antenna, and the penetration part may be formed in the dummy part.

The penetration part may be further formed in a central portion of the coil pattern.

The coil substrate may have a ground pattern formed between the coil pattern and the antenna, and the penetration part may be formed within the ground pattern.

The electronic device may further include an adhesion part interposed between the magnetic part and the coil substrate to bond the magnetic part to the coil substrate.

The electronic device may further include a voltage converter converting alternating current (AC) power supplied from the outside into AC voltage having a specific frequency to provide the converted AC voltage to the coil substrate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 1:
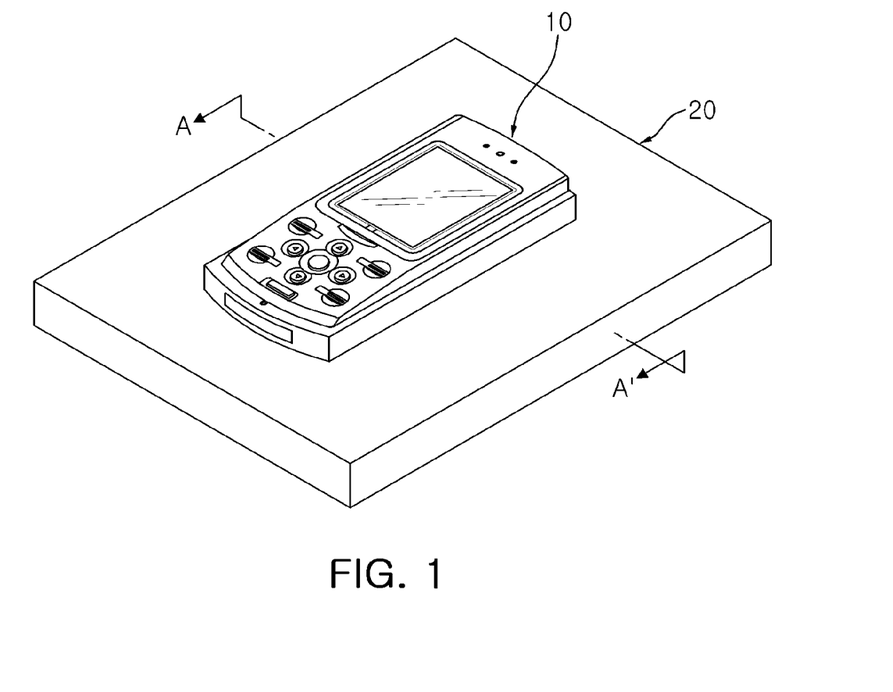
FIG. 1 is a perspective view schematically showing an electronic device and a wireless charging device according to an embodiment of the present invention.
Figure 2:
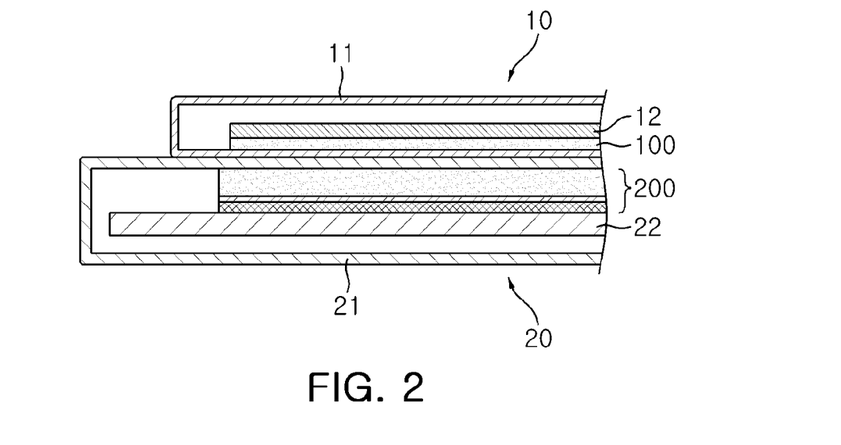
FIG. 2 is a cross-sectional view taken along line A-A' of FIG. 1.

FIG. 1 is a perspective view schematically showing an electronic device and a wireless charging device according to an embodiment of the present invention; and FIG. 2 is a cross-sectional view taken along line A-A' of FIG. 1.

Referring to FIGS. 1 and 2, an electronic device 10 according to the present embodiment may include a battery 12 and a contactless power receiver 100 supplying power to the battery 12 so as to charge the battery 12.

The battery 12 may be a secondary battery capable of being charged and discharged, and may be fixed to or separated from the electronic device 10.

The contactless power receiver 100 may be housed in a case 11 of the electronic device 10 to be directly attached to or to be disposed as closely as possible to an inner surface of the case 11.

In addition, a wireless charging device 20 according to the present embodiment is provided in order to charge the battery 12 of the electronic device 10. To this end, the wireless charging device 20 may include a contactless power transmitter 200 in a case 21 thereof.

The wireless charging device 20 may convert externally supplied commercially available alternating current (AC) power into direct current (DC) power and then converts the DC power into an AC voltage having a predetermined frequency to thereby provide the AC voltage to the contactless power transmitter 200. To this end, the wireless charging device 20 may include a voltage converter 22 converting the commercially available AC power into the AC voltage having a predetermined frequency.

When the AC voltage is applied to a coil of the contactless power transmitter 200, a magnetic field in the vicinity of the coil changes. Then, the voltage induced by changing the magnetic field is applied to the contactless power receiver 100 in the electronic device 10, adjacent to the contactless power transmitter 200, such that the battery 12 is charged.

Hereinafter, the contactless power receiver 100 included in the electronic device 10 will be described in detail.

Figure 3:
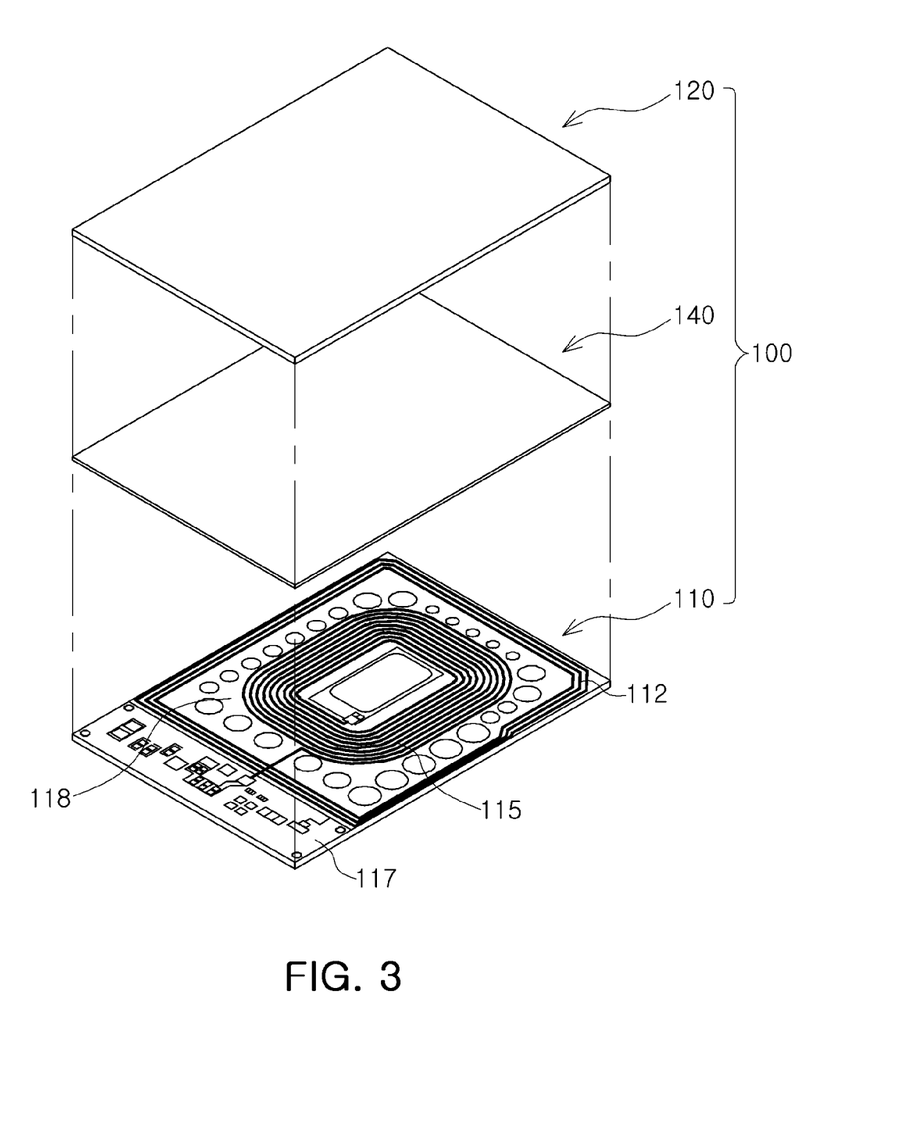
FIG. 3 is an exploded perspective view schematically showing a contactless power receiver according to an embodiment of the present invention.
Figure 4:
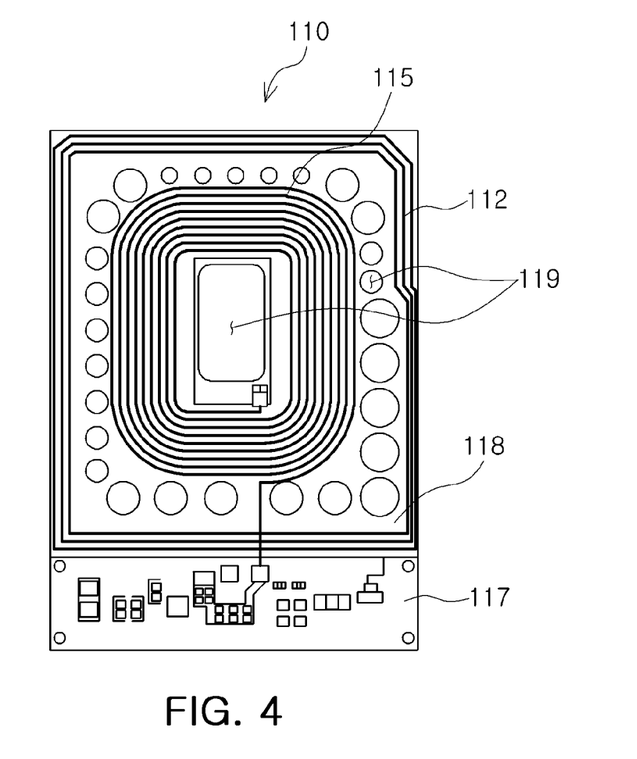
FIG. 4 is a plan view schematically showing a coil substrate shown in FIG. 3.

FIG. 3 is an exploded perspective view schematically showing a contactless power receiver according to an embodiment of the present invention; and FIG. 4 is a plan view schematically showing a coil substrate shown in FIG. 3.

Referring to FIGS. 3 and 4, the contactless power receiver 100 includes a coil substrate 110 and a magnetic part 120.

The magnetic part 120 has a flat plate shape (or a sheet shape), is disposed on one surface of the coil substrate 110, and is fixedly attached to the coil substrate 110. The magnetic part 120 is provided in order to efficiently form a magnetic path for a magnetic field generated by a coil pattern 115. To this end, the magnetic part 120 may be made of a material which may easily form the magnetic path, and may include a shielding sheet having the permeability of a ferrite sheet, for example.

However, the magnetic part 120 according to the present embodiment is not limited to the above-mentioned configuration but may be varied. For example, the magnetic part 120 may be formed by applying ferrite powder or magnetic solution to a surface of the coil substrate 110.

In addition, the magnetic part 120 according to the present embodiment may be used as a shielding sheet for shielding electromagnetic waves or a leaked magnetic flux. In this case, as the magnetic part 120, a shielding sheet having a high level of permeability, such as a metal composite sheet and an amorphous sheet, may be used. However, the invention is not limited thereto.

For example, instead of using a shielding sheet as the magnetic part 120, an additional shielding sheet may be provided on an outer surface of the magnetic part 120. Further, the magnetic part 120 may be provided as a plurality of sheets, rather than a single sheet. That is, the magnetic part 120 may be formed by stacking a ferrite sheet and a shielding sheet.

In addition, the contactless power receiver 100 according to the present embodiment may include an adhesion part 140 interposed between the coil substrate 110 and the magnetic part 120 so that the coil substrate 110 and the magnetic part 120 are firmly and fixedly adhered to each other.

The adhesion part 140 is disposed between the coil substrate 110 and the magnetic part 120 such that the magnetic part 120 adheres to the coil substrate 110. The adhesion part 140 may be formed of an adhesive sheet or an adhesive tape, or may be formed by applying an adhesive or a resin having adhesive properties to a surface of the coil substrate 110 or the magnetic part 120. Here, the adhesion part 140 may contain a ferrite powder so that it may have magnetism together with the magnetic part.

The coil substrate 110 may be an insulating substrate such as a printed circuit board (PCB), a ceramic substrate, a pre-molded substrate or a direct bonded copper (DBC) substrate, or may be an insulated metal substrate (IMS).

Advantageously, a flexible PCB which is thin and has a wiring pattern formed thereon, such as a film-type or a thin-type printed circuit board may be used as the coil substrate 110.

The coil substrate 110 may include the coil pattern 115, a circuit part 117, an antenna 112 and a dummy part 118, as shown in FIGS. 3 and 4.

The coil pattern 115 may be formed as a wiring pattern on at least one surface of the coil substrate 110. The coil pattern 115 according to the present embodiment is provided in a spiral form on one or both surfaces of the coil substrate 110, the ends of which are electrically connected to the circuit part 117.

In a case in which the coil patterns 115 are formed on both surfaces of the coil substrate 110, the coil patterns 115 may configure a parallel circuit by which both ends of one coil pattern 115 are electrically connected to both ends of the other coil pattern 115 or may configure a series circuit by which an end of one coil pattern 115 in a central portion thereof is connected to an end of the other coil pattern 115. To this end, a conductive via (not shown) for electrically connecting the coil patterns 115 may be formed in the coil substrate 110.

In the present embodiment, the coil pattern 115 is formed as a generally rectangular spiral pattern, by way of example; however, the coil pattern 115 is not limited thereto, but may have various shapes. For example, the coil pattern 115 may be formed as a circular spiral pattern, a polygonal spiral pattern, or the like.

Further, the coil pattern 115 may include an insulation protecting layer (for example, a resin insulating layer, not shown) formed thereon, as needed, for protecting the coil pattern 115 externally.

The circuit part 117 may be formed on one side of the coil substrate 110 to be electrically connected to the coil pattern 115. Further, the circuit part 117 may have a variety of passive or active elements formed thereon, and may also be electrically connected to the battery 12 of FIG. 2 for storing power to transmit power from the coil pattern 115 to the battery.

The antenna 112 may be formed around the coil pattern 115. Specifically, the antenna 112 may be formed on edges of the coil substrate 110, and the coil pattern 115 may be formed inside the antenna 112.

Like the coil pattern 115, the antenna 112 may be formed as a wiring pattern. The antenna 112 according to the present embodiment may be an antenna used in near field communications (NFC). However, the invention is not limited thereto.

Although the antenna 112 is formed outside the coil pattern 115 in the present embodiment, the invention is not limited thereto. That is, the antenna 112 is not limited to the above-mentioned configuration but may have various configurations. For example, the antenna 112 may be formed inside the coil pattern 115, or different antennas 112 may be formed inside and outside the coil pattern 115.

The dummy part 118 may be formed between the antenna 112 and the coil pattern 115. In a case in which the coil pattern 115 for wireless charging and the antenna 112 are formed in close proximity on one coil substrate 110, interference may occur therebetween.

Specifically, in a case in which the antenna 112 is used in NFC (the working frequency of 13.56 MHz) and a frequency of 100 kHz is applied to the coil pattern 115 for wireless charging, the antenna 112 for NFC and the coil pattern 115 for wireless charging should have different respective resonant frequencies.

However, in the case in which the coil pattern 115 for wireless charging and the antenna 112 are disposed in close proximity, a dual resonance phenomenon may occur, such that passive elements connected to the antenna or the coil circuit may be problematic.

Accordingly, the coil substrate 110 according to the present embodiment includes the dummy part 118 between the antenna 112 and the coil pattern 115 in order to prevent the above-described problem.

The dummy part 118 may have various widths unless it causes interference between the antenna 112 and the coil pattern 115. For instance, the width of the dummy part 118 may be approximately 5 mm, or approximately 2 mm depending on the material of the coil substrate 110 or various environmental conditions.

In addition, the coil substrate 110 according to the present embodiment includes one or more penetration parts 119. The penetration parts 119 may be formed as through holes, and may be located in the dummy part 118 and in a central portion of the coil pattern 115 in which no coil pattern 115 is formed.

Accordingly, the penetration part 119 may be formed to have a size corresponding to the width of the dummy part 118 or a size of the central portion of the coil pattern 115.

The penetration part 119 serves to provide a path along which the magnetic flux generated by the wireless charging device 20 of FIG. 2 may flow effectively. Without the penetration part 119, the flow of the magnetic flux generated around the coil pattern 115 may be interfered by the coil substrate 110. However, with the penetration part 119 according to the present embodiment, the magnetic flux may flow through the penetration part 119 of the coil substrate 110, such that charging efficiency is improved.

In a portable electronic device according to the above-described embodiment, the coil pattern 115 for wireless charging and the antenna 112 for near field communications are formed together in the coil substrate 110. Accordingly, no separate antenna is required, thereby reducing the size of the portable electronic device.

In addition, both of the coil pattern 115 and the antenna 112 are formed on the coil substrate 110 in the form of wiring patterns. Accordingly, the coil pattern 115 and the antenna 112 may be formed in the process of forming circuit patterns on the coil substrate 110, thereby facilitating the manufacturing process.

In addition, the coil substrate 110 according to the present embodiment includes the dummy part 118 between the coil pattern 115 and the antenna 112. Accordingly, interference between the coil pattern 115 for wireless charging and the antenna 112 may be prevented.

Further, the coil substrate 110 according to the present embodiment has one or more hole-like penetration parts 119 in the dummy part 118 and in the central portion of the coil pattern 115, thereby facilitating the flow of the magnetic flux to improve charging efficiency.

Meanwhile, the coil substrate according to the embodiment of the invention and the electronic device including the same are not limited to the above-described embodiment, but may be variously configured.

Figure 5:
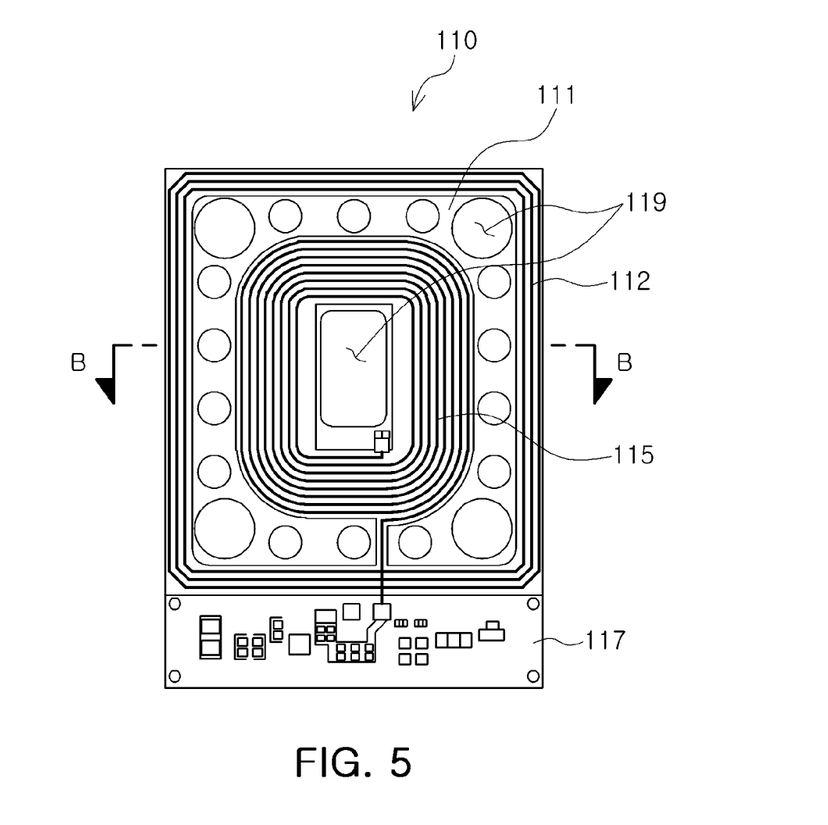
FIG. 5 is a plan view schematically showing a coil substrate according to another embodiment of the present invention.
Figure 6:
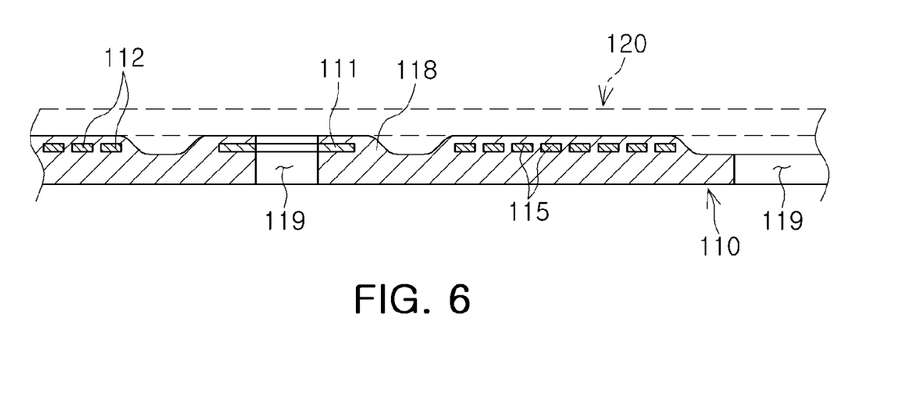
FIG. 6 is a cross-sectional view taken along line B-B' of FIG. 5.

FIG. 5 is a plan view schematically illustrating a coil substrate according to another embodiment of the present invention, and FIG. 6 is a cross-sectional view of FIG. 5, taken along line B-B'.

Referring to FIGS. 5 and 6, the coil substrate 110 according to this embodiment is configured similarly to the coil substrate 110 of FIG. 4 according to the above-described embodiment, except that the former further includes a ground pattern 111.

Therefore, a detailed description of the same configuration as that of the above-described embodiment of the invention will be omitted, and the ground pattern 111 will be described in detail.

The coil substrate 110 according to the present embodiment has the ground pattern 111 formed on the dummy part 118.

Like the coil pattern 115 and the antenna 112, the ground pattern 111 may be formed as a wiring pattern. Accordingly, the ground pattern 111 may be formed on the coil substrate 110 in the same process along with the coil pattern 115 and the antenna 112.

The ground pattern 111 may be electrically connected to a ground circuit of the circuit part 117 or a ground wiring. Further, the ground pattern 111 may serve to fill a space between the antenna 112 and the coil pattern 115. In addition, the penetration parts 119 may be formed within the ground pattern 111.

With the ground pattern 111, interference between the antenna 112 and the coil pattern 115 may be further minimized.

Further, with the ground pattern 111, a space between the coil substrate 110 and the magnetic part 120 may be minimized. In the case of the above-described embodiment, no wiring pattern is formed in the dummy part 118 so that the dummy part 118 is formed to be thinner than the antenna 112 or the coil pattern 115 by a thickness of the wiring pattern.

Thus, when the magnetic part 120 is stacked on the coil substrate 110, a space corresponding to the thickness of the wiring pattern may be formed between the dummy part 118 and the magnetic part 120. Such a space may be a cause of interference of the flow of the magnetic flux.

However, in the case in which the ground pattern 111 is formed in the dummy part 118 as in the embodiment shown in FIG. 6, the ground pattern 111 fills the space, thereby eliminating the cause of the interference of the flow of the magnetic flux.

Accordingly, charging efficiency may be further improved.

Figure 7:
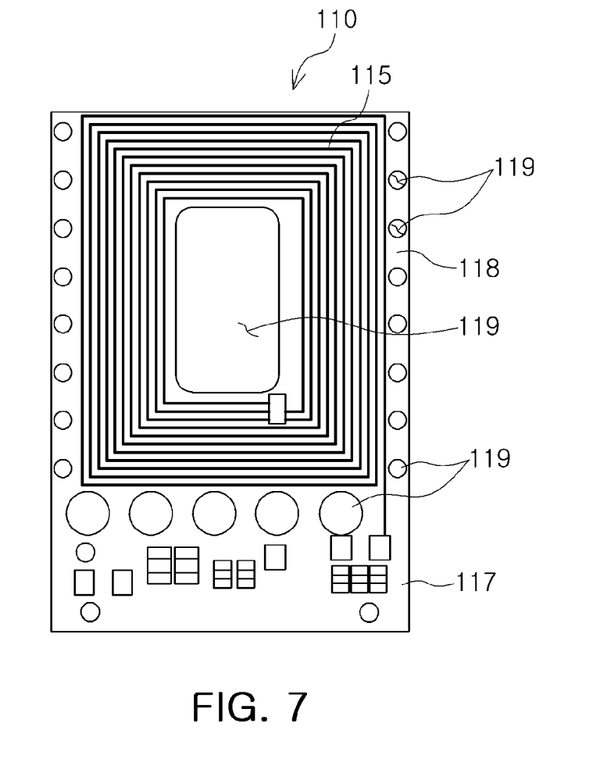
FIG. 7 is a plan view schematically showing a coil substrate according to another embodiment of the present invention.

FIG. 7 is a plan view schematically showing a coil substrate according to another embodiment of the present invention.

Referring to FIG. 7, the coil substrate 110 includes the coil pattern 115, the circuit part 117 and the dummy part 118, with no antenna.

Even in this case in which the coil substrate 110 has no antenna, the penetration parts 119 may be formed in the dummy part 118 and in the central portion of the coil pattern 115. That is, the penetration parts 119 may be formed at various locations in various forms depending on the shape of the coil pattern 115 or the shape of the dummy part 118.

Further, although not shown, the ground pattern 111 may be formed in the dummy part 118 as in the above-described embodiment.

The coil substrate may be equally applied to the contactless power transmitter 200 of FIG. 1 included in the wireless charging device, as well as portable devices. Therefore, a detailed description of the coil substrate applied to the contactless power transmitter 200 will be omitted.

In addition, although a single coil strand is formed on a single surface of the coil substrate in the above embodiments, the invention is not limited thereto.

That is, in a case in which the coil substrate has a large size, a plurality of coil strands may be formed on a single surface of the coil substrate, and in a case in which the coil substrate has a small size, only a single coil strand may be formed on a single surface of the coil substrate as in the above embodiments.

In addition, although embodiments in which a contactless power transmitter is employed in a portable device, have been described by way of example, the present inventive concept is not limited thereto but may be widely used in all electronic devices capable of being charged and all power transmission/reception devices capable of transmitting/receiving power.

As set forth above, according to embodiments of the invention, a coil pattern for wireless charging and an antenna for near field communications are formed together in a coil substrate in an electronic device. Accordingly, no separate antenna is required, thereby reducing the size of the electronic device.

Further, both of the coil pattern and the antenna are formed on the coil substrate as wiring patterns. Accordingly, the coil pattern and the antenna may be formed in the process of forming circuit patterns on the coil substrate, thereby facilitating the manufacturing process.

Further, the coil substrate according to the embodiments of the invention includes a dummy part between the coil pattern and the antenna. Accordingly, interference between the coil pattern for wireless charging and the antenna can be prevented.

Moreover, the coil substrate according to the embodiments of the invention has one or more hole-like penetration parts in the dummy part and in the central portion of the coil pattern, facilitating the flow of magnetic flux. Accordingly, charging efficiency can be improved.

While the present invention has been shown and described in connection with the embodiments, it will be apparent to those skilled in the art that modifications and variations can be made without departing from the spirit and scope of the invention as defined by the appended claims.

What is claimed is:

1. A coil substrate for wireless charging, comprising:
an insulating substrate;
a coil pattern formed on the insulating substrate;
an antenna formed on the insulating substrate and formed inwardly of or outwardly of the coil pattern;
a dummy part region formed between the coil pattern and the antenna;
a ground pattern formed on the insulating substrate and the dummy part region;
a first penetration part located in a central portion of the coil pattern; and
at least one second penetration part located in the ground pattern.

2. The coil substrate of claim 1, further comprising a circuit part formed on one side of the coil pattern to be electrically connected to the coil pattern.

3. The coil substrate of claim 1, wherein the antenna is used for near field communications.

4. A coil substrate for wireless charging, comprising:
an insulating substrate;
at least one coil pattern formed on the insulating substrate;
at least one antenna formed on the insulating substrate and spaced apart from the coil pattern;
a ground pattern formed on the insulating substrate and formed between the coil pattern, and the antenna;
a first penetration part located in a central portion of the coil pattern; and
at least one second penetration part located in the ground pattern.

5. An electronic device, comprising:
a coil substrate for wireless charging including an insulating substrate, at least one coil pattern formed on the insulating substrate and at least one antenna formed on the insulating substrate; and
a magnetic part attached to a surface of the coil substrate,
wherein the coil substrate has a ground pattern formed on the insulating substrate, a first penetration part located in a central portion of the coil pattern and at least one second penetration part located in the ground pattern.

6. The electronic device of claim 5, wherein the coil substrate has a dummy part region formed between the coil pattern and the antenna, and
the ground pattern is formed in the dummy part region.

7. The electronic device of claim 5, wherein the ground pattern is formed between the coil pattern and the antenna.

8. The electronic device of claim 5, further comprising an adhesion part interposed between the magnetic part and the coil substrate to bond the magnetic part to the coil substrate.

9. The electronic device of claim 5, further comprising a voltage converter converting alternating current (AC) power supplied from the outside into AC voltage having a specific frequency to provide the converted AC voltage to the coil substrate.

* * * * *